July 2, 1935. J. E. BOOGE ET AL 2,006,342
PROCESS OF MAKING ANHYDRITE
Filed May 18, 1934
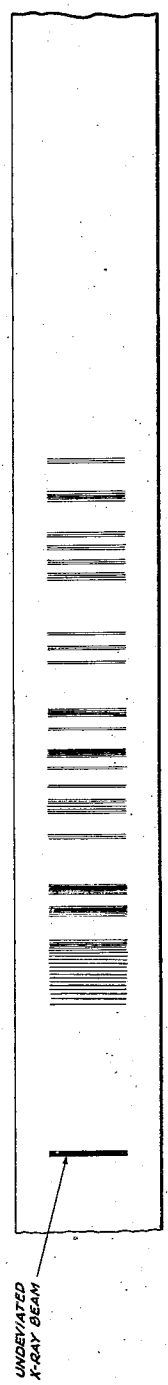
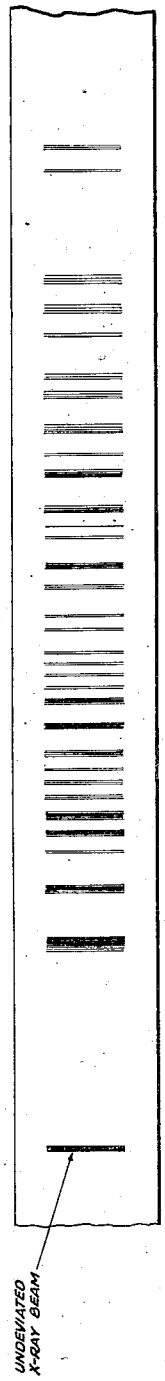
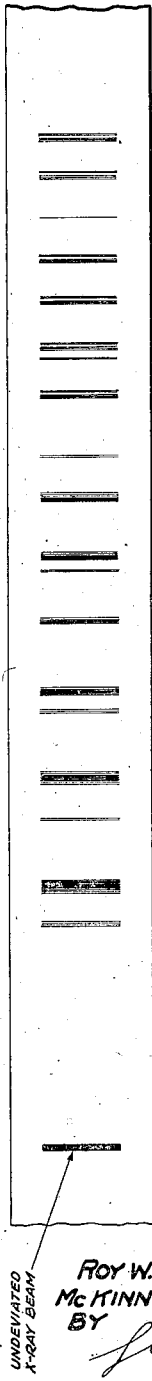
INVENTORS
ROY W. SULLIVAN, ROBERT M.
McKINNEY, JAMES E. BOOGE
BY
ATTORNEY Patented July 2, 1935

2,006,342

UNITED STATES PATENT OFFICE 2,006,342

PROCESS OF MAKING ANHYDRITE

James E. Booge, Newark, N. J., Robert M. McKinney, Linthicum Heights, Md., and Roy W. Sullivan, Richardson Park, Del., assignors to Krebs Pigment & Color Corporation, Newark, N. J., a corporation of Delaware Application May 18, 1934, Serial No. 726,300

37 Claims. (Cl. 23—122)

The present invention relates to a process of making calcium sulfate in the form of exceedingly small particles of anhydrite of the insoluble variety, particularly adapted for use as a pigment or pigment extender, and comprises digesting calcium sulfate in any of its other modifications in an aqueous medium and is particularly characterized by the employment of weakly dehydrating conditions or elevated temperatures and the addition of a separately prepared seeding substance composed of or comprising particles of insoluble anyhdrite.

Calcium sulfate is known in four modifications: gypsum, which is a duo-hydrate of the formula $CaSO_4.2H_2O$, plaster of Paris, a hemi-hydrate of the formula $CaSO_4.1/2H_2O$, soluble anhydrite, and insoluble anhydrite. The present invention is entirely concerned with the production of insoluble anhydrite from another of the modifications of calcium sulfate.

Chemical analysis evidences no difference in composition between the soluble and insoluble anhydrite modifications. The reactivity of the two compounds, as their name already indicates, is quite different. Soluble anhydrite is a strong desiccating agent and in contact with water it hydrates easily and quickly. Insoluble anhydrite is inert and much more stable in aqueous suspension. A difference in the crystal structure of the soluble and insoluble anhydrite modifications is clearly shown by their X-ray diffraction patterns as illustrated in the appended figures.

Fig. 1 shows a diffraction pattern obtained by standard methods from a soluble anhydrite product.

Fig. 2 shows a diffraction pattern of insoluble anhydrite.

Fig. 3 is the X-ray diffraction pattern of sodium chloride obtained under the same conditions and is shown merely as a standard for comparison purposes.

The bands shown on the original negatives of the X-ray diffraction patterns from which these figures were drawn are represented in these figures by groups of fine lines and the number and thickness of the lines is intended to indicate relative intensity and approximate width of the bands.

The early literature contains many conflicting statements in respect to the formation of anhydrite, the existence of two modifications of anhydrous calcium sulfate having long escaped detection. Careful check of such prior processes has shown us that calcination of a calcium sulfate above temperatures of about 500° C. forms insoluble anhydrite, whereas dehydration in an aqueous medium, for instance water at 107° C., or very dilute acids at elevated temperature, forms in every instance a very unstable, easily hydrated product either of the hemi-hydrate or soluble anhydrite type, which products are more or less hygroscopic and easily hydrated and thereby differentiate from the insoluble anhydrite which is stable against water.

For purposes of the present invention we might call those well known conditions under which the hygroscopic hemi-hydrate and soluble anhydrite are formed mild-dehydrating conditions and use the term strong-dehydrating conditions only for such known conditions where insoluble anhydrite is formed directly and whenever used herein these terms should be understood to have this meaning.

We have found that under the mild-dehydrating conditions under which gypsum is dehydrated in a liquid suspension to hemi-hydrate or to soluble anhydrite, insoluble anhydrite is formed, provided the reaction mixture contains a substantial amount of preformed particles of insoluble anhydrite which act as a seed.

Diluted sulfuric acid, that is to say of a strength above about 1.5%, is the most convenient medium for effecting the transformation of gypsum or other form of calcium sulfate into insoluble anhydrite of fine particle size according to our invention. Aqueous solutions of salts and acids other than sulfuric acid can be used but there is in every instance possibility of side reactions with formation of substances which would act as impurities for the anhydrite.

Anhydrite of fine particle size can be produced according to our invention from practically every type of sufficiently pure calcium sulfate, available in the forms of duohydrate, hemihydrate or soluble anhydrite. We can use natural, ground gypsum; coarsely crystallized, soluble anhydrite; plaster of Paris, etc.; we can likewise use by-product calcium sulfate as obtained, for instance, in the manufacture of phosphoric acid from phosphate rock, or gypsum precipitated by the action of sulfuric acid upon lime or other calcium compounds; or gypsum obtained by the metathetical reaction of a soluble sulfate with a soluble calcium compound.

There appears to be no direct relationship between the particle size of the calcium sulfate used as the raw material and the particle size of the anhydrite formed in our process, except that it is naturally preferable to start with a reasonably finely disintegrated calcium sulfate as the speed of reaction, or conversion, depends to a certain extent upon the degree of division of the raw material.

We have found that many types of finely divided insoluble anhydrite form efficient seeds. For example, natural insoluble anhydrite after fine grinding is effective; similar, good results are obtained by using a seed obtained by calcining gypsum, plaster of Paris or soluble anhydrite to temperatures at which insoluble anhydrite is formed. Other efficient seeds are produced when gypsum, etc. is subjected to strong dehydrating conditions such as treatment with strong sulfuric acid at an elevated temperature or when a small amount of lime or other decomposable calcium compound is added to a large excess of strong sulfuric acid while maintaining the mixture at an elevated temperature.

The temperature conditions under which a separately prepared anhydrite seed will transform gypsum or a hygroscopic calcium sulfate into non-acicular, insoluble anhydrite depend upon the acidity of the aqueous medium in which the transformation takes place. In a non-acid medium, such as for instance a saturated sodium chloride solution, the formation of the anhydrite takes place at temperatures of about 100° C. or above. In a medium, the acidity of which corresponds to 5% sulfuric acid, complete transformation takes place at about or above 90° C.; at concentrations up to the equivalent of 35% sulfuric acid, transformation into anhydrite takes place at temperatures as low as 60° C.; still lower temperatures being effective with increasing acid concentrations.

The above conditions exemplify mild dehydrating conditions under which, in the absence of a seed, hemi-hydrate or soluble anhydrite would be formed.

It will be evident from the above that there is a wide range of conditions under which an anhydrite seed will cause the conversion of gypsum or a hygroscopic calcium sulfate into insoluble anhydrite. The most practical conditions exist, however, when the aqueous medium is a sulfuric acid of less than about 35% strength, as for instance from 20 to 25% down to 1.5%.

It is unnecessary in the performance of our invention to start with a preformed hydrated calcium sulfate or soluble anhydrite, it is in many instances preferred to form the calcium sulfate in the presence of the seed.

A convenient manner of precipitating calcium sulfate in sulfuric acid is to add lime, CaO, hydrated lime, calcium carbonate, calcium phosphate or other easily decomposable calcium compounds to dilute sulfuric acid. Under ordinary conditions gypsum is precipitated. At elevated temperature a hydroscopic calcium sulfate, such as hemi-hydrate or soluble anhydrite, is precipitated. If under such mild dehydrating conditions a seed of insoluble anhydrite is added and the digestion continued for an hour or more at elevated temperature in the presence of the seed insoluble anhydrite is obtained as the final reaction product.

A very convenient acid liquor from which to precipitate calcium sulfate or in which the conversion of gypsum into insoluble anhydrite can be effected is represented by the weak acid liquors obtained by the hydrolysis of titanium sulfate. Such residual acids contain, for instance, from about 10 to 35% sulfuric acid, with minor amounts of titanium salts and usually substantial amounts of iron salts. The impurities, such as iron salts contained therein, do not interfere with the precipitation and transformation of the calcium sulfate.

When the formation of calcium sulfate and its conversion into insoluble anhydrite is combined and effected by a reaction of sulfuric acid with a decomposable calcium compound, such as lime or calcium carbonate, it is advisable to adjust the reactants in such a manner that the final digestion liquor contains about from 1.5% to 10% free $H_2SO_4$.

We are illustrating in the following a few applications of our invention to the production of insoluble anhydrite.

Example I.—Preparation of an insoluble anhydrite seed under strong dehydrating conditions.

277 cc. of a lime slurry containing 500 g. $Ca(OH)_2$ per litre were slowly run into 484 cc. of 60° Bé. sulfuric acid which had previously been heated to about 75° C. Vigorous stirring was necessary to prevent spattering. The amount of lime used was such that the resulting anhydrite was suspended in an approximately 50% sulfuric acid solution.

This precipitate constituted an efficient seed for use in the conversion of gypsum or hygroscopic calcium sulfate compositions into insoluble anhydrite under mild dehydrating conditions.

Seeds prepared in this manner were found to be very active and amounts down to about 5% based on the total calcium sulfate to be converted into insoluble anhydrite are sufficient, though we generally prefer to use larger amounts of seed, from 10 to 20% or even more.

Other efficient seeds are prepared by calcination of gypsum above about 500° C. up to 800° C. or up to temperatures at which calcium sulfate decomposes.

Natural, ground insoluble anhydrite has also been used very successfully as a seed in the conversion of gypsum or hygroscopic calcium sulfate compositions into fine particles of insoluble anhydrite according to our invention.

We have, furthermore, used the insoluble anhydrite produced according to our invention as a seed for subsequent operations, either directly or after calcination. By re-cycling a part of the anhydrite produced we are in this manner enabled to completely transform gypsum into insoluble anhydrite using a dilute sulfuric acid as the reaction medium without having to provide for a seed prepared by a different process.

Example II.—Direct preparation of insoluble anhydrite under mild dehydrating conditions in the presence of a seed.

A finely ground, natural, insoluble anhydrite seed was added to 100 cc. of a boiling dilute 25% sulfuric acid, such as obtained as a by-product in the hydrolysis of titanium sulfate. 833 cc. of a lime slurry containing 500 g. $Ca(OH)_2$ per litre was then run in slowly while at the same time 2620 cc. of the same boiling 25% sulfuric acid was also run in, care being taken that the acid was always in excess. When the precipitation was completed the slurry contained about 20% acid in excess of that neutralized. After digestion at the boiling point for one hour the slurry was filtered hot, washed and dried. The product obtained was very stable against re-hydration and showed an X-ray diffraction pattern identical with that of insoluble anhydrite obtained, for instance, by calcining gypsum to temperatures above 500° C. The so obtained insoluble anhydrite is perfectly white and of very fine particle size. It can be used as a seed in subsequent operation and is perfectly adapted as a white pigment or as an extender for paint pigments.

The same results can be obtained by using a seed as prepared under Example I.

*Example III.*—Dehydration of gypsum in the presence of an insoluble anhydrite seed under mild dehydrating conditions.

Finely divided gypsum was suspended in a saturated sodium chloride solution at 100° C.; to this was added 20% of a seed as prepared in Example I and the mass digested for 4 hours at 100° C. The calcium sulfate was substantially completely dehydrated, the product obtained was insoluble anhydrite of fine particle size and showed the X-ray diffraction pattern of the insoluble anhydrite.

In the absence of the seed the dehydration of the gypsum under the same conditions proceeded only to the hemi-hydrated calcium sulfate, as evidenced by chemical and X-ray analysis.

*Example IV.*—The digestion of gypsum was carried out under conditions entirely similar to those of Example III, except that 40% of a seed was used which was obtained by disintegration of natural insoluble anhydrite. After 3 hours digestion at 100° C. the product was converted substantially entirely into finely divided particles which showed the characteristic X-ray diffraction pattern of insoluble anhydrite.

*Example V.*—Gypsum was suspended in dilute sulfuric acid of 5% strength to form a slurry which was heated to about 100° C. and 40%, based on the gypsum, of natural, ground anhydrite added. After 3 hours digestion the material was substantially completely transformed into a finely divided calcium sulfate which showed the characteristic X-ray diffraction pattern of insoluble anhydrite.

Treating gypsum under the same conditions but in the absence of the seed produced only an insignificant amount of dehydration and no insoluble anhydrite could be found in the digested product.

*Example VI.*—To the seed prepared as in Example I was added in the same vessel 950 grams of finely divided ground natural gypsum and sufficient water to reduce the acid concentration to less than 5% $H_2SO_4$. The mass was digested at 100° C. for 3 hours, after which the product was converted substantially completely into finely divided particles which showed the characteristic X-ray pattern of insoluble anhydrite.

*Example VII.*—2000 grams of soluble anhydrite were suspended in a 5% sulfuric acid to form a stirrable suspension. To this was added an amount of insoluble anhydrite seed as obtained in Example I. The mass was digested for 3 hours at 100° C. The soluble anhydrite was substantially completely transformed into the insoluble modification.

It will be understood that when we speak of a separately prepared seed we do not limit ourselves to a seed prepared in a vessel different from that in which the digestion of the calcium sulfate is performed; conditions such as shown in Example VI are considered to come within the meaning of separately prepared seed. The term "separately prepared seed" is, however, intended to exclude such conditions where the seed and the calcium sulfate to be converted into insoluble anhydrite are formed jointly by the same chemical reactions.

Results entirely similar to those described in the above examples are obtained by treatment of plaster of Paris or soluble anhydrite.

Electrolytes present in the aqueous medium used for digesting calcium sulfate have a marked effect on speeding up the conversion of the calcium sulfate into insoluble anhydrite. The most convenient electrolyte to be used is sulfuric acid as with this agent there is no danger of contamination of the reaction product with compounds which would be detrimental to the use of the insoluble anhydrite, good results are, however, also obtained in aqueous media containing large amounts of neutral, soluble salts, such as sodium chloride, sodium sulfate, sodium nitrate and other alkali metal or ammonium salts such as potassium salts and mixtures thereof. Only such compounds can naturally be used which do not react with the calcium and sulfate ion to form compounds less soluble than calcium sulfate.

The temperature of the digestion liquor is conveniently maintained around 100° C. or at the boiling point of the conversion media, though lower temperatures can be used, provided the conditions selected are sufficient to dehydrate gypsum to hemihydrate or to soluble anhydrite in the absence of a seed.

The conditions for the preparation of insoluble anhydrite in the presence of a seed described in the above batch operations are likewise applicable to processes of the continuous type where, for instance, a slurry of a calcium compound and a dilute sulfuric acid are simultaneously run into a reaction vessel and the reaction product is continuously removed. In this case we, for instance, leave a substantial amount of insoluble anhydrite in the reaction zone or we also add concurrently a product consisting of insoluble anhydrite. We prefer then to run the overflow into a larger vessel in which the digestion is continued for some time before we separate the insoluble anhydrite from the reaction liquor. We can also provide for a suspension of insoluble anhydrite and separately and continuously mix the calcium compound with the dilute sulfuric acid, or other sulfate and then run the reaction product continuously into the seed suspension.

We claim:

1. In a process of making insoluble anhydrite, the step of digesting another modification of calcium sulfate in an aqueous medium and at elevated temperature in the presence of a separately prepared seed comprising particles of insoluble anhydrite.

2. The process of claim 1 in which the seed is prepared by digesting calcium sulfate in strong sulfuric acid under strong dehydrating conditions.

3. The process of claim 1 in which the seed is prepared by mixing lime and strong sulfuric acid under strong dehydrating conditions.

4. The process of claim 1 in which the seed is natural ground anhydrite.

5. The process of claim 1 in which the seed is a calcium sulfate calcined to temperatures at which insoluble anhydrite is formed.

6. The process of claim 1 in which the other modification of calcium sulfate is gypsum.

7. In a process of making the insoluble anhydrite modification of calcium sulfate, the step of digesting another of the modifications of calcium sulfate in an aqueous medium under mild dehydrating conditions in the presence of a separately prepared seed comprising particles of insoluble anhydrite.

8. The process of claim 7 in which the seed is prepared by digesting calcium sulfate in strong sulfuric acid under strong dehydrating conditions.

9. The process of claim 7 in which the seed is prepared separately by mixing lime and strong sulfuric acid under strong dehydrating conditions.

10. The process of claim 7 in which the seed is natural ground anhydrite.

11. The process of claim 7 in which the seed is prepared by calcining calcium sulfate to temperatures at which insoluble anhydrite is produced.

12. The process of claim 7 in which the other modification of calcium sulfate is gypsum.

13. In a process of making the insoluble anhydrite modification of calcium sulfate, the step of digesting another of the modifications of calcium sulfate in an aqueous solution of an electrolyte, which does not react with calcium or sulfate ions to form compounds less soluble than calcium sulfate and in the presence of a separately prepared seed comprising particles of insoluble anhydrite.

14. In a process of making the insoluble anhydrite modification of calcium sulfate, the step of digesting another of the modifications of calcium sulfate under mild dehydrating conditions in an aqueous solution of an electrolyte which does not react with calcium or sulfate ions to form compounds less soluble than calcium sulfate and in the presence of a substantial amount of a separately prepared seed comprising particles of insoluble anhydrite.

15. In a process of making the insoluble anhydrite modification of calcium sulfate, the step of digesting another of the modifications of calcium sulfate in dilute sulfuric acid at elevated temperature and in the presence of a separately prepared seed comprising particles of insoluble anhydrite.

16. The process of claim 15 in which the seed is prepared by digesting calcium sulfate in strong sulfuric acid under strong dehydrating conditions.

17. The process of claim 15 in which the seed is prepared by mixing lime and strong sulfuric acid under strong dehydrating conditions.

18. The process of claim 15 in which the seed is natural ground anhydrite.

19. The process of claim 15 in which the seed is prepared by calcining calcium sulfate to temperatures at which insoluble anhydrite is formed.

20. The process of claim 15 in which the other modification of calcium sulfate is gypsum.

21. In a process of making the insoluble anhydrite modification of calcium sulfate, the step of digesting another of the modifications of calcium sulfate in dilute sulfuric acid at elevated temperature in the presence of a separately prepared seed comprising particles of insoluble anhydrite, the process being further characterized in that the strength of the acid is between about 1.5 and 35% $H_2SO_4$ and the digestion temperature is correlated with the strength of the acid so that for an acid of 35% the temperature is at least 60° C. and for an acid of 1.5% the temperature is at least 100° C.

22. The process of claim 21 in which the seed is prepared by digesting calcium sulfate in strong sulfuric acid under strong dehydrating conditions.

23. The process of claim 21 in which the seed is prepared by mixing lime and strong sulfuric acid under strong dehydrating conditions.

24. The process of claim 21 in which the seed is natural ground anhydrite.

25. The process of claim 21 in which the seed is prepared by calcining a calcium sulfate to temperatures at which an insoluble anhydrite is produced.

26. The process of claim 21 in which the other modification of calcium sulfate is gypsum.

27. In a process of making the insoluble anhydrite modification of calcium sulfate, the step of digesting another modification of calcium sulfate in a waste acid liquor obtained in the hydrolysis of a titanium salt solution at elevated temperature and in the presence of a seed comprising particles of insoluble anhydrite.

28. In a process of making insoluble anhydrite, the step of mixing dilute sulfuric acid with a minor amount of insoluble anhydrite and a major amount of another modification of calcium sulfate and digesting the mixture under mild dehydrating conditions.

29. The process of making insoluble anhydrite which comprises precipitating calcium sulfate from an aqueous solution of an electrolyte at elevated temperature and in the presence of a separately prepared seed comprising particles of insoluble anhydrite and digesting said mixture under mild dehydrating conditions.

30. The process of making insoluble anhydrite which comprises precipitating calcium sulfate from dilute sulfuric acid and digesting it at an elevated temperature in the presence of a separately prepared and added seed comprising particles of insoluble anhydrite.

31. The process of claim 30 in which the seed is prepared by digesting calcium sulfate in strong sulfuric acid under strong dehydrating conditions.

32. The process of claim 30 in which the seed is prepared by mixing lime and strong sulfuric acid under strong dehydrating conditions.

33. The process of claim 30 in which the seed is natural ground anhydrite.

34. The process of claim 30 in which the seed is prepared by calcining calcium sulfate to temperatures at which insoluble anhydrite is produced.

35. The process of claim 30 in which the precipitating conditions are such that in the absence of the seed gypsum would be produced.

36. Process of making insoluble anhydrite which comprises precipitating calcium sulfate in sulfuric acid and adjusting the amount of reactants to obtain at the end of the precipitation an acid liquor of from about 1.5 to 10% free $H_2SO_4$ and digesting it in the reaction liquor at an elevated temperature in the presence of a separately prepared seed comprising particles of insoluble anhydrite.

37. The process of making insoluble anhydrite which comprises precipitating calcium sulfate from a waste acid liquor obtained in the hydrolysis of titanium sulfate and digesting it under acid conditions and at elevated temperature in the presence of a separately prepared seed comprising particles of insoluble anhydrite.

JAMES E. BOOGE.
ROY W. SULLIVAN.
ROBERT M. McKINNEY.